Dec. 30, 1924.
P. SARTORY
1,520,968
STEAMING TUBE FOR HAIR WAVING AND CURLING
Filed Feb. 6, 1922   2 Sheets-Sheet 1
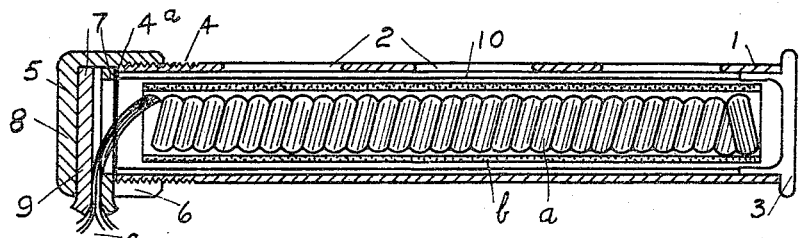
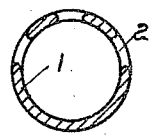
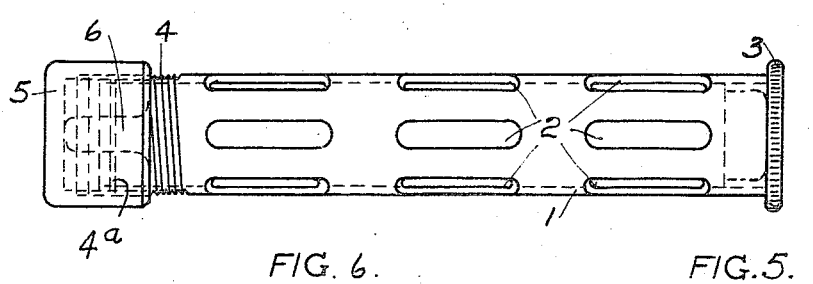
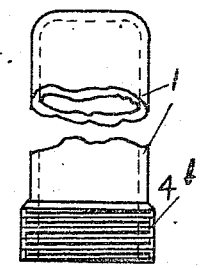
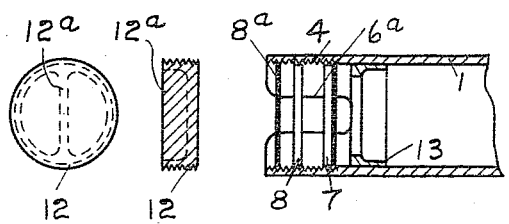
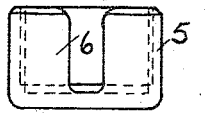
Inventor.
Peter Sartory
By R V Bowden
Attorney Dec. 30, 1924.　　　　　　　　　　　　　　　　　　　　1,520,968
P. SARTORY
STEAMING TUBE FOR HAIR WAVING AND CURLING
Filed Feb. 6, 1922　　　　2 Sheets-Sheet 2
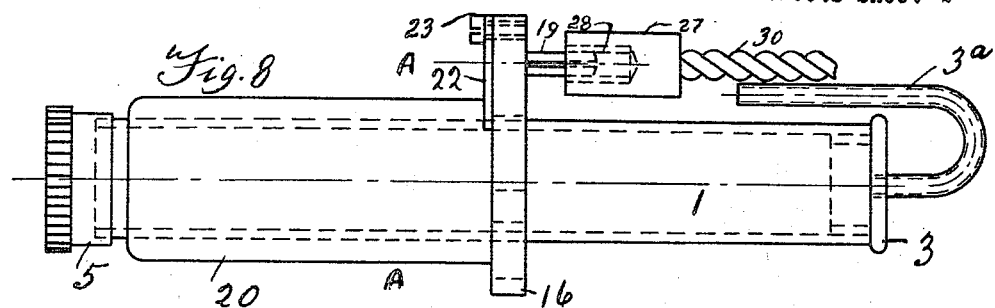
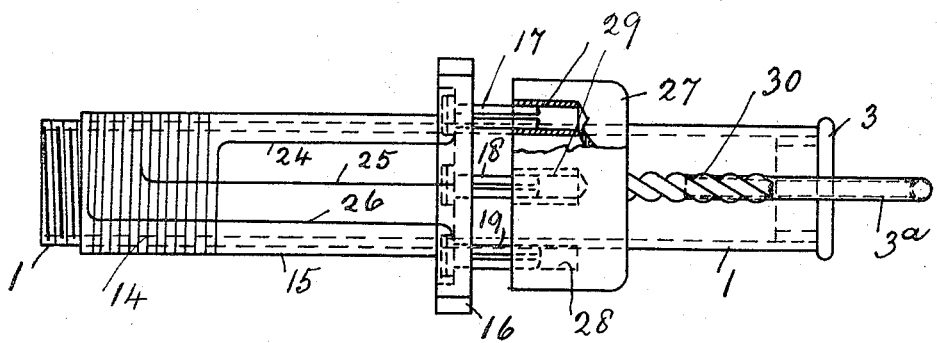
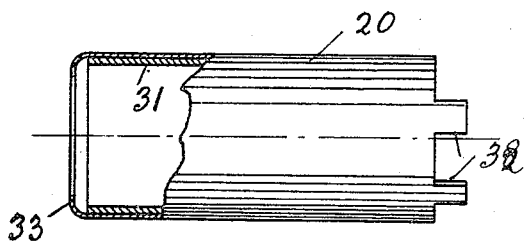
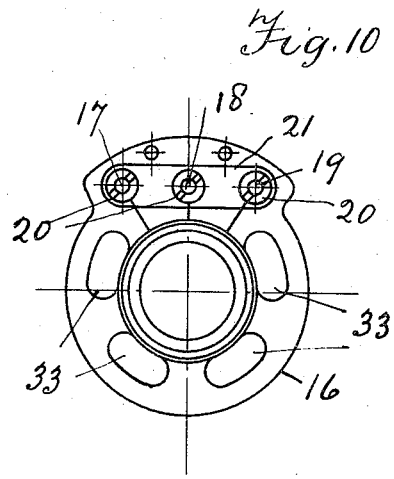
Inventor
Peter Sartory
by R. Bowden
Attorney.

Patented Dec. 30, 1924.

1,520,968

UNITED STATES PATENT OFFICE.

PETER SARTORY, OF BAYSWATER, LONDON, ENGLAND.

STEAMING TUBE FOR HAIR WAVING AND CURLING.

Application filed February 6, 1922. Serial No. 534,484.

*To all whom it may concern:*

Be it known that I, PETER SARTORY, a subject of the King of Great Britain and Ireland, residing at Bayswater, London, W. 2, England, have invented an Improved Steaming Tube for Hair Waving and Curling, of which the following is a specification.

This invention relates to steaming tubes used in processes of permanently waving growing hair, and similar hair dressing operations, and has for its object to provide steaming tubes of a new and improved type which can be readily secured without tying, to the coiled tresses of hair arranged upon the curlers in the usual manner, which steaming tubes may also be furnished with suitable electric or other heating means to form combined steaming tubes and heaters, so as to dispense with the separate tubular and like heaters hitherto employed in such processes.

In processes of permanently waving growing hair, tresses of hair are secured to and tightly wound upon curlers, moistened steaming pads containing the borax or other reagents employed in the processes being secured over the hair, the tresses so arranged are then enclosed in paper steaming tubes which have to be securely bound and tied to the hair near its roots, to prevent steam escaping from the lower end of the tube and scalding the scalp, when the tubular or other heaters are applied to the steaming tubes. The paper steaming tubes also readily absorb the moisture from the borax or other steaming pads enclosed therein, especially when such pads have been well wetted, so that the paper steaming tubes become soft and readily break during the application of the heaters, allowing the steam to escape with considerable risk of scalding the scalp. To avoid such damage to the paper steaming tubes, the borax and like pads are often insufficiently moistened, and are then speedily dried off by the action of the heaters, the hair instead of being well steamed, becoming more or less baked in a dry heat which has injurious effects.

According to this invention steaming tubes for use in processes of permanently waving growing hair on the head, each comprise a detachable closure or gland that allows the tube to be readily slipped over a tress of hair arranged upon a curler as usual, the projecting end or ligament of such hair tress being then sealed steam-tight into the adjacent end of the applied steaming tube by means of the closure or gland. The opposite end of the tube is provided with a detachable cap or plug, or may be permanently closed, while slots or perforations are suitably arranged in the tube for the escape of steam and vapour, or a suitable vent may be arranged in the detachable cap or plug which closes the outer or opposite end of the steaming tube.

The closure or gland may comprise a cap or plug adapted to screw into or over the end of the steaming tube, and packing washers or the like so arranged as to make a steam-tight joint with the projecting end or ligament of the hair tress, when the cap or plug is adjusted to the steaming tube.

When the closure or gland comprises a screw plug, the end of the steaming tube is slotted laterally, to afford a passage for the root end or ligament of the hair tress, and is provided with an internal flange or collar adjacent to the inner end of the slot, to form the seat for an annular packing washer. Such washer may be split so that it can be opened and passed laterally over the ligament of the hair tress, or it may be threaded over the coiled hair tress. The steaming tube is applied so that its slotted end passes over the ligament of the hair tress, the same bearing against the annular washer in the tube, an elastic washer is then placed in the slotted end of the tube and covered by a light metal washer, the screw plug is then screwed into the end of the tube so that the hair tress end or ligament is clamped steam-tight between the packing washers, which latter are each provided with a lateral tongue that rides in the slot, to form a larger clamping surface for the hair.

When the closure or gland comprises a screw cap, the slot for the projecting end or ligament of the hair tress is formed in the cap instead of the steaming tube, the end of the latter being either externally screwed or furnished with a screw ferrule, to receive the cap. In this case the annular packing washer seats on the end of the tube while the opposite packing washer is carried in the slotted cap, the slot in which is guided over the projecting end or ligament of the hair tress. The cap is then held while the end of the steaming tube is screwed into same thus clamping the end or ligament of the tress enclosed by the tube, steam-tight between the packing washers.

The improved steaming tubes are made of metal such as aluminium, or of other suitable waterproof or substantially waterproof material or composition, and are adapted for use with separate heaters in the ordinary manner. Alternatively, the improved steaming tubes may be furnished with suitable electric heating resistances, or other preferred heating means, so that the same form combined steaming tubes and heaters, thus dispensing with the separate heaters ordinarily employed.

My invention is further described with reference to the accompanying drawings, by way of illustration.

Fig. 1 is a longitudinal sectional view, Fig. 2 a cross section, and Fig. 3 an external plan view of a steaming tube according to the present invention.

Figs. 4 and 5 illustrate a modified steaming tube having a closure or gland similar to that in Figs. 1 and 2.

Fig. 6 is a detail view illustrating a modified construction of closure or gland for sealing the projecting end or ligament of a tress of hair into the steaming tube.

Figs. 7 are detail views further illustrating the screw cap shown in Figs. 1 and 2.

Fig. 8 is a side view, and Fig. 9 a plan view with parts removed and partly in section, of a combined steaming tube and heater in accordance with the present invention.

Fig. 10 is a cross-section on A—A Fig. 8 and Fig. 11 a detail view of the detachable sleeve for the heater.

Figs. 12 are detail views of the annular packing washers presently referred to, while Fig. 13 is a diagram illustrating the application of the improved steaming tubes to the head.

In Fig. 1, $a$ indicates a tress of growing hair, arranged upon a suitable curler, not shown and enclosed in a saturated borax or other steaming pad $b$ in known manner, while $c$ indicates the projecting end or ligament of the coiled hair tress from the scalp.

As shown at Figs. 1, 2 and 3, the steaming tube 1 of aluminium or other suitable material, is formed with longitudinal slots 2, in the upper part thereof, to allow steam and vapour to escape therefrom when the tube is in use. The outer end of such tube is closed by a metal or other plug 3 which can be easily removed and replaced. The opposite end 4 of the tube is externally screw threaded and adapted to carry a removable gland or closure comprising a screw cap 5 provided with a lateral slot 6 and soft elastic packing washers 7 and 8, each of which is furnished with a lateral tongue 9 that projects through the slot in the cap. The washer 7 is annular, (see Figs. 1 and 9) and seats upon an inner flange $4^a$ on the end of 4 of the tube 1. Such washer is cemented to a similar fibre or other hard washer $7^a$ (see Fig. 9) to form its seating face against the flange $4^a$, while the packing washer is carried in the cap 5.

To apply the steaming tube, the plug 3 and cap 5 are first removed and a suitable paper lining tube 10, (see Fig. 1) may be inserted in the steaming tube 1 to prevent the steaming pad $b$ on the hair tress, adhering thereto. The annular washer 7 and the steaming tube 1 are passed over the coiled hair tress the end 4 of the tube being towards the scalp, so that the washer 7 seats upon the flange $4^a$. The cap 5 carrying the washer 8 is then applied so that its slot 6 passes over the ligament $c$ of the hair tress, and also the tongue 9 of the washer 7, as indicated in Fig. 1.

The cap 5 is held while the threaded end of the steaming tube 1 is screwed into same, to clamp the ligament $c$ of the hair tress steam-tight between the tongues 9 of the washers 7 and 8. During the tightening of the slotted cap 5, the tongues 9 of the packing washers bend in the slot 6, while the hair tress ligament $c$ spreads laterally and allows the washers to form a steam tight joint between the tube 1 and the cap 5, the plug 3 being then placed in the opposite end of the tube. When applied, the steaming tubes 1 are suspended from the head 11 by the ligaments $c$ of the hair tresses, as roughly indicated by the diagram Fig. 10.

The improved steaming tubes enable the steaming pads as $b$, to be saturated with water the excess of which can collect in the lower part of the steaming tube, and is readily dried off on the application of heat, while to facilitate the escape of steam and vapour through the slots 2, when a paper lining, as 10, is employed, the latter is punctured or cut opposite the slots.

In the modification illustrated at Figs. 4 and 5, the steaming tube 1 is formed with a permanently closed end, the plug 3 being dispensed with, while the open end 4 of the tube is furnished with an externally threaded ferrule $4^b$, the screw cap 5 being of sufficient diameter to engage the same. The edge of the ferrule $4^b$ affords a seating surface for the annular packing washer 7 and enables the internal flange $4^a$ on the edge of the tube 1 to be dispensed with.

If preferred, a screw ferrule, such as $4^b$, may be applied to a tube open at both ends instead of threading the same.

As illustrated at Figs. 6 the closure or gland for the end 4 of the steaming tube 1, comprises a screw plug 12 instead of a cap as last described. The end 4 of the steaming tube is internally threaded for engagement with the plug 12 and is provided with a lateral slot 6ª to afford a passage for the ligament c of the coiled hair tress. The tube 1 is provided with an internal flanged collar 13 adjacent to the inner end of the slot 6ª to form a seating for an annular packing washer 7, the tongue 9 of which projects through the lateral slot in the end of the tube 1. The washer 7 may be split, as indicated at 7ᵇ Fig. 9, so that the same can be opened and passed laterally over the ligament c of the hair tress, when the steaming tube is applied thereto. The washer 7 is inserted in the tube 1 so that it seats on the flanged collar 13, with its tongue 9 projecting through the slot 6ª of the tube, such slot being guided over the ligament of the hair tress. The packing washer 8 is then inserted in the tube so that its tongue 9 rides in the slot therein and covers the ligament of the hair tress, a similar metal washer is then inserted and the plug 12 screwed into the end of the tube 1, while the latter is held so as to clamp the ligament of the hair tress steam-tight between the packing washers as previously described. The plug 12 is recessed and furnished with a finger grip 13ª; or is otherwise adapted to facilitate manipulation thereof.

When the outer or opposite end of the steaming tube 1 is closed by means of a removable plug, as shown in Fig. 1, the plug 3 may be furnished with a bent vent tube 3ª (see Fig. 8), in which case slots or perforations in the tube, such as indicated at 2, (Figs. 1, 2 and 3) may be dispensed with. The bent vent tube 3ª also serves to trap excess moisture which tends to collect in the lower end of the steaming tube when the same is secured to a tress of hair, as indicated at Fig. 10.

The improved steaming tubes may be permanently jacketed with electric heaters as illustrated at Figs. 8, 9, 10 and 11. The heater shown comprises a coil of resistance wire 14 wound over a layer of asbestos 15 that is wrapped round the tube 1, an insulating disc or carrier 16 on which terminal pins 17, 18 and 19 for the coil 14, are mounted, and a detachable sleeve or cover 20 for shielding the coil 14 and its leads.

The insulating disc 16 is secured to the tube 1, while the contact pins 17, 18 and 19, carried by such disc, are secured thereto by screw nuts 20 housed in a recess 21 formed in such disc; the recess 21 being provided with a detachable cover 22, secured by screws 23, see Fig. 8.

The coil 14 is connected by three leads 24, 25 and 26 to the respective contact pins 17, 18 and 19, the coil being thus divided into two sections, either of which can be placed in circuit by means of a reversible plug 27 provided with a dummy socket 28, and with two bushed sockets 29 which latter are connected to a convenient source of current through the flex wires 30. As shown in Fig. 9, the section of the coil 14 between the leads 24 and 25 is connected up through the pins 17 and 18, and the bushed sockets 29 of the plug contact. By reversing the plug, the section of the coil between the leads 25 and 26 is placed in circuit through the pins 18 and 19 which then make contact with the bushed sockets 29. The coil 14 is disconnected by removing the plug 27.

The detachable sleeve or cover 20 is furnished with a liner 31 of mica or other insulating material. One end of such sleeve is provided with tongues 32, which, when the sleeve is applied, engage with recesses 33 formed in the disc 16 for this purpose, while the opposite end of the sleeve is run down to form a flange 33, see Fig. 11, which fits snugly against the tube 1. The closure 3 at the outer end of the steaming tube 1 may be furnished with a bent vent tube 3ª as shown, or the unjacketed part of the tube 1 may be provided with vent holes 2 as previously described.

I claim:—

1. A device for steaming a tress of natural hair arranged upon a curler, comprising a rigid tube of moisture proof material adapted to slip axially over said hair tress, a longitudinally adjustable closure associated with flexible packing members at one end of said tube for sealing such tube end steam-tight to the projecting end or ligament of the hair tress in said tube and means for venting the latter.

2. A device for steaming a tress of natural hair arranged upon a curler and enclosed in a moistened steaming pad, comprising a rigid tube of heat and moisture proof material adapted to slip axially over said hair tress, a removable liner in said tube, means at one end of said tube for making a steam-tight joint with the projecting root end or ligament of the hair tress in said tube, a closure at the opposite end of said tube and means for venting the latter.

3. A device for steaming a tress of natural hair arranged upon a curler, comprising in combination a tube closed at one end and provided at its opposite end with a seating, a packing on said seating, a gland adapted to form a steam-tight closure with said packing and a steam-tight joint with the projecting root end or ligament of a tress of hair in said tube, as the gland is applied to that end of the latter, and means for venting said tube.

4. A device for steaming a tress of natural hair arranged upon a curler, comprising a rigid tube of moisture proof material adapted to slip axially over said tress, and furnished at one end with a longitudinally adjustable closure associated with flexible packing members adapted to afford a lateral passage for, and to make a steam-tight joint with the projecting end or ligament of the hair tress in said tube, a closure at the opposite end of said tube and means for venting the latter.

5. A device for steaming a tress of natural hair arranged upon a curler comprising a tube adapted to slip axially over said tress, and furnished at one end with a slotted cap in combination with packing washers adapted to afford a passage for and to make a steam-tight joint with the projecting end or ligament of the hair tress in said tube, on the application of said cap to said end of said tube, a detachable closure at the opposite end of said tube, and means for venting the latter.

6. A device for the purpose set forth, comprising a tube adapted to slip axially over a tress of natural hair arranged upon a curler, comprising a perforated tube closed at one end, the opposite end of said tube being laterally slotted, and furnished with an internal flange adjacent said slot, a detachable plug and packing washers adapted to close said slotted tube end steam-tight upon the projecting root end or ligament of the tress of hair in said tube.

7. A device for steaming a tress of natural hair arranged upon a curler, comprising a tube adapted to slip axially over said hair tress, one end of said tube being provided with a removable plug having a vent tube fitted therein, the opposite end of said tube having means for sealing said end steam-tight to the projecting root end or ligament of a tress of hair in said tube.

In testimony whereof I affix my signature.

PETER SARTORY.